UNITED STATES PATENT OFFICE.

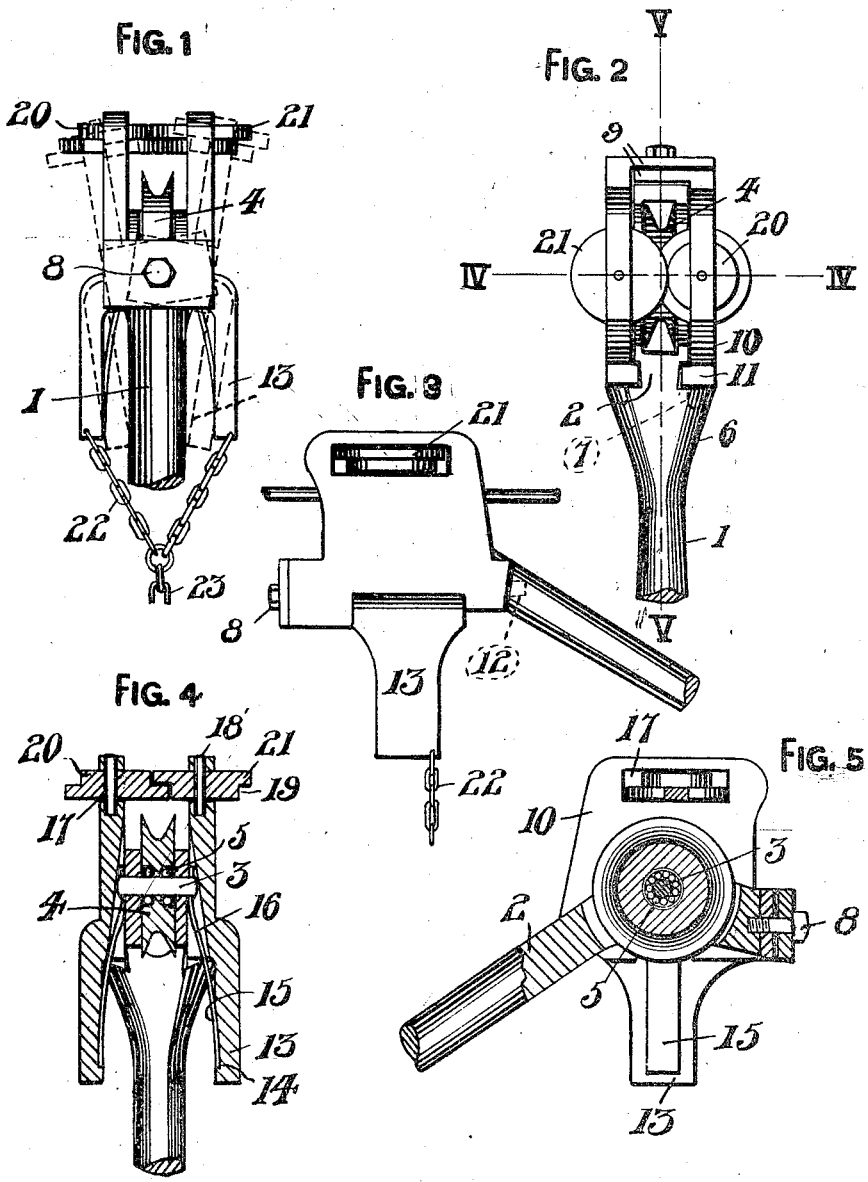

JOSEPH PULIT, OF NEW HAVEN, CONNECTICUT.

TROLLEY.

1,062,414. Specification of Letters Patent. Patented May 20, 1913.

Application filed March 19, 1912. Serial No. 684,732.

*To all whom it may concern:*

Be it known that I, JOSEPH PULIT, a subject of the Emperor of Austria-Hungary, residing at New Haven, in the county of New Haven and State of Connecticut, have invented certain new and useful Improvements in Trolleys, of which the following is a specification, reference being had therein to the accompanying drawing.

This invention relates to trolleys, and the objects of my invention are to provide an especially designed trolley harp, in connection with which there is an attachment that prevents accidental displacement of a trolley wheel relatively to a wire, rail, or electric conductor, and to provide a yieldable harp attachment that will not interfere with trolley wire hangers, frogs, or other overhead construction of an electric trolley railway.

Further objects of my invention are to provide a trolley that can be advantageously used in connection with high speed suburban railways for preventing a trolley wheel from becoming accidentally displaced when curved sections of trolley wire are encountered, or irregularities in the trolley wire, and to accomplish the above results by a mechanical construction that is durable, easy to manipulate and highly efficient for the purposes for which it is intended.

I attain the above objects by a mechanical construction that will be hereinafter specifically described and then claimed, and reference will now be had to the drawings, wherein like numerals denote corresponding parts throughout the several views, in which—

Figure 1 is a rear elevation of a trolley in accordance with this invention. Fig. 2 is a plan of the same. Fig. 3 is a side elevation of the trolley. Fig. 4 is a cross sectional view taken on the line IV—IV of Fig. 2, and Fig. 5 is a longitudinal sectional view taken on the line V—V of Fig. 2.

Referring to the drawing in detail, Fig. 1 denotes a trolley pole having its upper portion enlarged as at 6 and projecting centrally from said enlarged portion 6 is a harp 2 closed at its upper end as well as its inner end and which has its outer portion disposed at an angle relative to the pole 1 as clearly shown in Fig. 5. Mounted transversely of the harp 2 is a journal pin 3 upon which is revolubly mounted a trolley wheel 4. To reduce friction between the pin 3 and the wheel 4 anti-friction bearing balls are interposed as indicated at 5.

The reference character 10 denotes guard members each arranged at one side of the harp 2 and each provided with a depending arm 13 with an inwardly extending lug 11 opposing the enlarged end 6 of the pole 1 and each of said lugs 11 is pivotally mounted upon a pin 12 carried by the enlarged end 6 of the pole 1. Each of the guard members 10 is furthermore provided with an inwardly projecting arm 9 opposing the free end of the harp 2, the said arms 9 overlapping each other and pivotally connected to the free end of the harp 2 by a bolt 8 which extends through the arms 9 and the said arms 9 are mounted upon the bolt 8 by a nut or other suitable device.

By the foregoing construction and arrangement of parts it is obvious that the guard members are pivotally connected to the pole and to the harp, each of the arms 13 has its inner side recessed, as at 14 to receive the lower ends 15 of flat springs 16 mounted upon the ends of the journal pin 3. The flat spring 16 normally maintains the guard members 10 in a vertical position, for a purpose that will presently appear.

The upper ends of the guard members 10 are slotted, as at 17, and revolubly mounted in the said slots by vertical pins 18 are horizontal interlocking guard wheels 19 and 20. Each guard wheel has a peripheral flange 21 and the guard wheel 19 is arranged the reverse of the wheel 20, whereby the flanges 21 of said wheels will interlock above the trolley wheel 4 and thereby prevent displacement of said trolley wheel relatively to a trolley wire.

Connected to the lower ends of the arms 13 are the branch chains 22 of a main chain or rope 23. By pulling upon the main chain or rope 23, the lower ends of the arms 13 are shifted toward each other to open the upper ends of the guard members 10 and permit of the trolley wheel 4 being removed from the trolley wire.

It is thought that the operation and utility of the trolley will be apparent without further description, and I would have it understood that the structural elements are susceptible to such changes as are permissible by the appended claim.

What I claim is—

The combination with a trolley pole having an enlarged upper end, of a horizontally disposed harp inclining upwardly from each end toward the center, one of the ends of said harp being closed and the other formed integral centrally with the enlarged upper end of said pole, a trolley wheel revolubly mounted centrally of said harp, guard members vertically disposed with respect to said harp, inwardly extending lugs carried by said members and provided with trunnions journaled in the enlarged end of the pole at the sides of that end of the harp integral with the pole, inwardly extending arms integral with the rear edges of said members overlapping each other and opposing the free end of the harp, horizontally disposed means for pivotally connecting said arms to the free end of said harp, each of said members provided with a horizontally disposed rectangular slot at the top thereof, guard wheels mounted in said slots for projecting over said trolley wheel and overlapping each other, and means secured to the sides of the harp centrally thereof and engaging the lower portions of said members, for maintaining said guard wheels in overlapping position.

In testimony whereof I affix my signature in the presence of two witnesses.

JOSEPH PULIT.

Witnesses:
JOHN PULIT,
FRANK KRAMARSZYK.